United States Patent
Teng et al.

(10) Patent No.: US 9,509,689 B1
(45) Date of Patent: Nov. 29, 2016

(54) SECURITY FOR CLOUD SYSTEMS AND VIRTUALIZATION CLOUD SYSTEMS, MOBILE CLOUD SYSTEMS AND MOBILE VIRTUALIZATION CLOUD SYSTEMS, AND COMPUTER CLUSTERS AND MOBILE DEVICE CLUSTERS

(71) Applicants: Victoria Kien Man Teng, Saratoga, CA (US); Robert Kien Fai Teng, Scott Valley, CA (US); Joshua Hanson Tsui-Teng, Saratoga, CA (US); Matthew Tsui-Teng, Saratoga, CA (US)

(72) Inventors: Victoria Kien Man Teng, Saratoga, CA (US); Robert Kien Fai Teng, Scott Valley, CA (US); Joshua Hanson Tsui-Teng, Saratoga, CA (US); Matthew Tsui-Teng, Saratoga, CA (US)

( * ) Notice: Subject to any disclaimer, the term of this patent is extended or adjusted under 35 U.S.C. 154(b) by 76 days.

(21) Appl. No.: 14/710,228

(22) Filed: May 12, 2015

(51) Int. Cl.
*G06F 21/60* (2013.01)
*H04L 29/06* (2006.01)

(52) U.S. Cl.
CPC ........... *H04L 63/0861* (2013.01); *H04L 63/20* (2013.01)

(58) Field of Classification Search
CPC ... G06F 21/62; G06F 21/78; H04L 63/0428; H04L 63/1441
See application file for complete search history.

(56) References Cited

U.S. PATENT DOCUMENTS

2015/0249687 A1* 9/2015 O'Hare ............... H04L 9/085 726/3
2015/0294118 A1* 10/2015 Parker ............... G06F 21/606 726/26

* cited by examiner

*Primary Examiner* — Izunna Okeke
(74) *Attorney, Agent, or Firm* — Jingming (James) Cai; SAC Attorneys LLP

(57) ABSTRACT

A computer implemented method and a cloud security system are provided for securing data in a cloud storage environment. The cloud security system receives data of multiple types from multiple sources and decodes the received data. The cloud security system stores the decoded data in one or more of multiple storage locations within the cloud storage environment and allocates one or more of multiple security actions to be performed on the stored data in each of the storage locations. The cloud security system applies multiple security algorithms to perform the allocated security actions on the stored data in each of the storage locations. The cloud security system encodes resultant data obtained from the application of the security algorithms to the stored data with a security identifier in combination with one or more of a user's authentication information, biometric data, and supplementary parameters for facilitating secure access to the resultant data.

18 Claims, 6 Drawing Sheets

SECURITY FOR CLOUD SYSTEMS AND VIRTUALIZATION CLOUD SYSTEMS, MOBILE CLOUD SYSTEMS AND MOBILE VIRTUALIZATION CLOUD SYSTEMS, AND COMPUTER CLUSTERS AND MOBILE DEVICE CLUSTERS

CROSS-REFERENCE TO RELATED APPLICATIONS

This application claims priority to and the benefit of provisional patent application No. 62/014,579 titled "Security for cloud systems and virtualization cloud systems, mobile cloud systems and mobile virtualization cloud systems, and computer clusters and mobile device clusters", filed in the United States Patent and Trademark Office on Jun. 19, 2014. The specification of the above referenced patent application is incorporated herein by reference in its entirety.

BACKGROUND

An emerging information technology (IT) delivery model is cloud computing, by which shared resources, software, and information are provided as a service over a network, for example, the internet to computers, mobile devices, and other user devices. Cloud computing enables an on-demand network access to a shared pool of configurable computing resources. Cloud computing systems in virtualized computing environments comprise servers, network storage devices, routers, gateways, communication links, and other devices. Cloud computing systems accelerate application performance, enable companies to quickly deliver business results, achieve greater productivity, realize a faster time to market, and result in increased customer satisfaction. Cloud computing systems also provide the ability to store, share, and analyze large amounts of data, thereby ensuring that users have access to information at the right time which, in turn, improves decision making, productivity, and collaboration. Cloud computing can significantly reduce IT costs and complexities while improving workload optimization and service delivery.

Cloud computing systems are widely used, for example, in the medical industry, legal litigation and administration fields, certified public accounting (CPA) firms, the banking industry, brokerage firms, educational institutions, etc., for storing critical data comprising, for example, medical records, legal data, company data, community data, financial data, banking data, educational records, etc. Although cloud computing has become increasingly popular for internal operations and external operations in personal and public cloud computing systems and provides many advantages, data security in a cloud storage environment and in user devices remains a major concern. While technical and legal protection may exist, the integrity, confidentiality, and privacy of critical business information deployed in a cloud storage environment cannot be ensured absolutely.

Concerns over identity theft have led users and resource providers to add additional layers of security, for example, long and more complicated passwords and multifactor authentication solutions. Different technologies have been developed to prevent security breaches in cloud computing systems. For example, physical security of cloud computing systems is addressed by locating the cloud computing systems in a secure facility. Communication links are encrypted or secured to prevent eavesdropping in communications with computing resources. Application programs and databases are secured using authentication protocols to prevent unauthorized access. However, online fraud has grown into a sophisticated underground economy that requires infrastructure on a massive scale. Phishing, password cracking, and denial-of-service attacks by botnets compromise computers, which in turn target web servers to allow thousands of password attempts per hour and other online password cracking activities. For stakeholders in cloud hosting environments, the implication is a higher expectation of being targeted for server takeovers, root-kitting, and botnet command-and-control insertions.

Hence, there is a long felt but unresolved need for a computer implemented method and system that secures data in a cloud storage environment. Moreover, there is a need for a computer implemented method and system that maintains integrity, confidentiality, and privacy of information stored in the cloud storage environment. Furthermore, there is a need for a computer implemented method and system that prevents online password cracking activities on information stored in the cloud storage environment.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above stated needs for securing data in a cloud storage environment. Moreover, the computer implemented method and system disclosed herein maintains integrity, confidentiality, and privacy of information stored in the cloud storage environment. Furthermore, the computer implemented method and system disclosed herein prevents online password cracking activities on information stored in the cloud storage environment.

The computer implemented method and system disclosed herein provides a cloud security system comprising at least one processor configured to execute computer program instructions for securing data in a cloud storage environment. The cloud security system disclosed herein provides security for cloud systems, virtualization cloud systems, mobile cloud systems, mobile virtualization cloud systems, computer clusters, and other cloud systems and device clusters on computing devices, for example, personal computers, mobile devices, etc. The cloud security system receives data of multiple types from multiple sources. The cloud security system decodes the received data and stores the decoded data in one or more of multiple storage locations within the cloud storage environment. The cloud security system allocates one or more of multiple security actions to be performed on the stored data in each of the storage locations. The cloud security system applies multiple security algorithms configured to perform the allocated security actions on the stored data in each of the storage locations. The cloud security encodes resultant data obtained from the application of the security algorithms to the stored data with a security identifier in combination with one or more of a user's authentication information, biometric data, and supplementary parameters for facilitating secure access to the resultant data.

In one or more embodiments, related systems include but are not limited to circuitry and/or programming for affecting the methods referenced herein; the circuitry and/or programming can be any combination of hardware, software, and/or firmware configured to affect the herein-referenced methods depending upon the design choices of a system designer. Also, various structural elements may be employed depending on the design choices of the system designer.

The kernel of the computer and compiler of firmware in computer can be access through the security compiler in the instruction set in firmware. This another layer of the security that can control system attack and prevent to lock the CPU and computer of the cloud data center, Mobile cloud data, virtualization cloud mobile access point and data, and virtualization of the cloud data of the access point and its interface between End-point user and data center. The operating system of each end user computer and data access point data can be isolated or connected safely and securely.

In the meantime, the kernel of the computer and compiler of firmware in computer can be access through the security compiler in the instruction set in firmware. It prevents "passport" or "back door" features to pull data away at the cloud data computer, mobile cloud data computer, and Virtualization cloud data computer, and virtualization mobile cloud data for data monitoring, or spy, or steal information due to development periods.

The Kernel of the computer cluster can be connect together make it become a clusters or cloud, or mobile cloud, or virtualization mobile cloud, or virtualization cloud clusters in Kernel level and layers to prevent Virus to attack the Kernel and paralyze the whole cloud clusters and virtualization cloud clusters and virtualization mobile cloud computer clusters, and mobile cloud clusters.

The Total Security Manager can secure all system in one place. It provides total complete security solution in one place for CPU, Kernel, API, Private Cloud, Public Cloud, Hybrid Cloud, Virtualization Cloud system, Virtualization Mobile Cloud system, Big Data Cloud System, Big Data Mobile Cloud System.

The BIG DATA CLOUD TOTAL TRAFFIC CONTROL MANAGER/MOBILE CLOUD TRAFFIC CONTROL MANAGER are prevent big data traffic overflow or underflow. It provides best traffic solution for different cloud clusters Private Cloud, Public Cloud, Hybrid Cloud, Virtualization Cloud system, Virtualization Mobile Cloud system, Big Data Cloud System, Big Data Mobile Cloud System.

The Total Security Manager can be separate for individual security pieces or integrated together as a whole solution for fast speed and efficient.

The BIG DATA CLOUD TOTAL TRAFFIC CONTROL MANAGER/MOBILE CLOUD TRAFFIC CONTROL MANAGER can be separate for individual security pieces or integrated together as a whole solution for fast speed and efficient.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
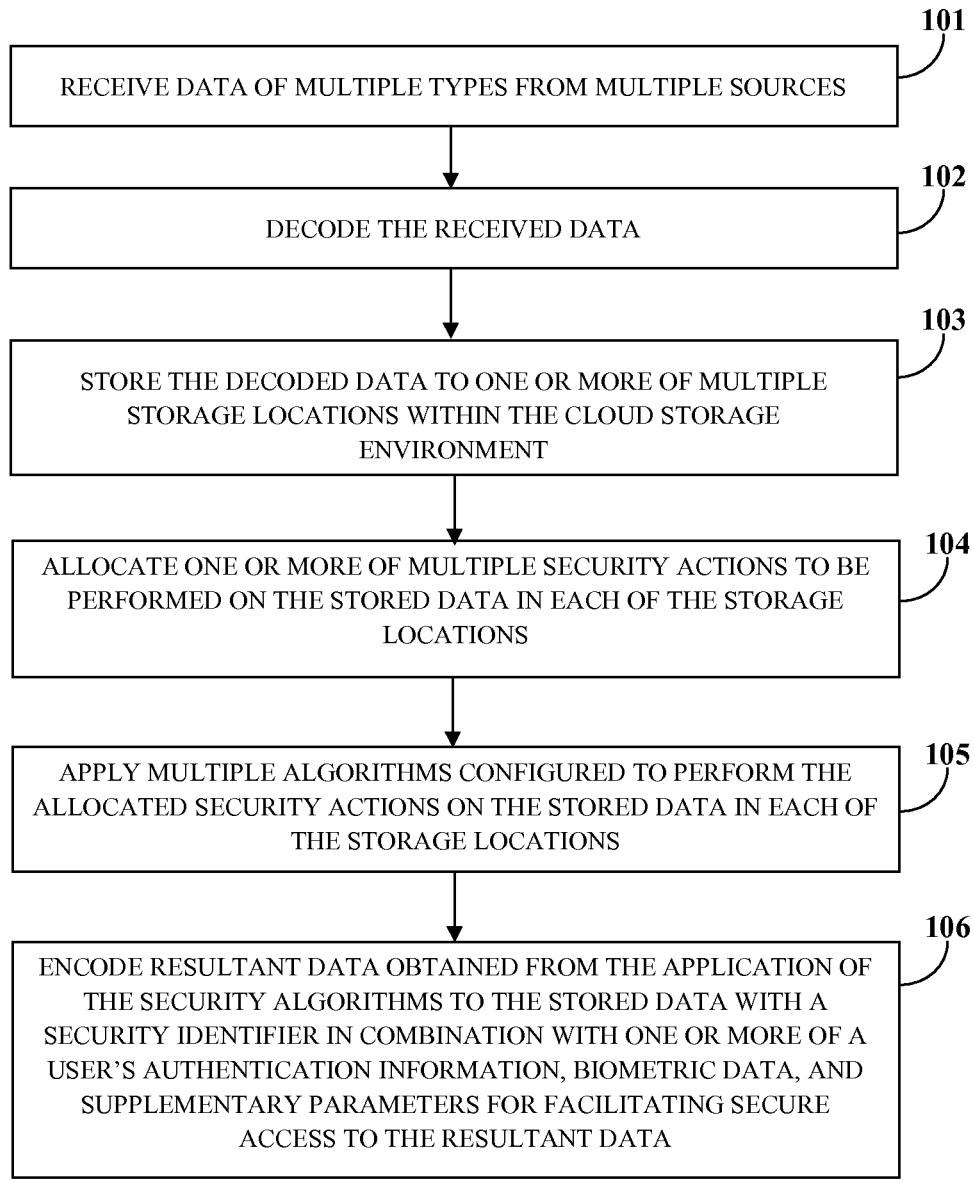
FIG. 1 illustrates a computer implemented method for securing data in a cloud storage environment.

FIG. 1 illustrates a computer implemented method for securing data in a cloud storage environment. As used herein, "securing data" refers to protecting data, for example, medical information, legal information, financial information such as certified public accountant (CPA) information, personal information, etc., from unwanted actions by unauthorized users. Also, as used herein, "cloud storage environment" refers to a data storage environment where data from different computing devices such as personal computers, mobile devices, etc., is stored in cloud computing systems comprising, for example, virtualization cloud systems, mobile cloud systems, mobile virtualization cloud systems, computer clusters, mobile device clusters, etc. The computer implemented method disclosed herein employs a cloud security system comprising at least one processor configured to execute computer program instructions for securing data in a cloud storage environment. In an embodiment, the cloud security system is a computer system comprising a central processing unit (CPU) implemented on a computing device, for example, a personal computer, a mobile computer, a workstation, a server, etc. In another embodiment, the cloud security system is implemented as a virtualization cloud security system, a mobile cloud security system, a mobile virtualization cloud security system, a wireless cloud security system, etc., on computing devices, for example, mobile devices, personal computers, etc.

The cloud security system receives 101 data of multiple types from multiple sources, for example, storage systems and storage devices of different types. The data comprises, for example, electronic data, textual data, image data, file data, website, online store, virtualization cloud machine store, virtualization mobile cloud store etc., stored in databases, files such as Microsoft® Office® documents such as Microsoft® Word documents, Microsoft® Excel® spreadsheets, Microsoft® PowerPoint® presentations, media files, files in a portable document format (PDF) of Adobe Systems Incorporated, files in archive file formats such as a zip archive file format, etc., mobile data, etc. In an embodiment, the cloud security system assigns a header associated with a location of the source from where the data is received, to each piece of data. The cloud security system uses the header to transmit the security enhanced data to the location of the source from where the data was received. The paths of input data flows from the sources and output data flows to the locations of the sources or other secure locations go through the cloud security system. In an embodiment, the cloud security system provides security to a virtual machine and the received data via encryption and decryption of the received data in combination with software components and hardware components. The cloud security system comprises additional features, for example, a self-burst feature, a self-create feature, etc. The cloud security system implements self-bursting of electronic mails (emails) and files, for example, after 30 minutes of transmission without interruption. The cloud security system adjusts a time of burst according to a function of a project, or a program, or a file. In an embodiment, the cloud security system stores received data, for example, emails, files, etc., after a predetermined period of time, for example, 30 minutes subsequent to transmitting the data without interruption for self-protection of the emails, files, etc.

In an embodiment, the cloud security system protects the received data by performing archive encryption and decryption. The cloud security system performs real time correction and detection in the cloud storage environment. The cloud security system protects data from data transition and data corruption. The cloud security system receives the data, which will be decoded and stored in different storage locations or different storage devices. The cloud security system decodes 102 the received data and stores 103 the decoded data in one or more of multiple storage locations within the cloud storage environment. For example, after decoding the received data, the cloud security system stores the received data in different nodes, storage systems, or storage devices in the cloud storage environment.

The cloud security system allocates 104 one or more of multiple security actions to be performed on the stored data in each of the storage locations. The cloud security system allocates different functions of the decoded data to specific storage locations. The cloud security system applies 105 multiple security algorithms configured to perform the allocated security actions on the stored data in each of the storage locations. The security actions comprise, for example, elimination of malware from the stored data, elimination of cookie information and history information associated with the stored data, elimination of a Trojan horse malware program in the stored data, elimination of viruses that piggyback on the stored data, validating watermarking of a network and the storage locations, etc. For example, the cloud security system applies different security algorithms to perform elimination of electronic mails (emails) associated with money spam, elimination of phishing emails, elimination of a compromised address book associated with compromised email addresses, etc. The cloud security system triggers the storage locations to implement the different security algorithms. The cloud security system implements the security algorithms to provide edge to edge security to the cloud storage environment.

The cloud security system performs the security actions on the stored data using the security algorithms. The security algorithms comprise, for example, the Huffman coding algorithm, the Ruby code detection algorithm, the Theta-0 graph Tutte's algorithm, the double star snark algorithm, the Coxeter graph algorithm, the flower snark algorithm, the Blanusa snark algorithm, Peterson's algorithm, the Herschel algorithm, the Hamiltonian algorithm, a mesh algorithm, etc., as exemplarily illustrated in FIG. 3. In an embodiment, the cloud security system executes Peterson's algorithm to eliminate files infected with a Trojan horse malware program in the stored data. The cloud security system executes the Herschel algorithm to eliminate files in the stored data infected with malware. The cloud security system executes the Hamiltonian algorithm to eliminate files infected with viruses that piggyback on the stored data. The cloud security system executes the Huffman coding algorithm to facilitate lossless compression of files in the stored data. The cloud security system maintains visibility and control, when leveraging a third party cloud system or other internal cloud systems, which protects a user's identity from hackers. Furthermore, the cloud security system detects security and compliance risks on application of the security algorithms in real time and facilitates delivery of secure mobile and web applications. The security algorithms allow the cloud security system to provide security to computer clusters, servers, data centers, personal computers, and other computing devices of users.

The cloud security system encodes 106 resultant data obtained from the application of the security algorithms to the stored data with a security identifier, for example, a global identifier (ID), in combination with a user's authentication information, biometric data, and supplementary parameters for facilitating secure access to the resultant data. The biometric data comprises, for example, a fingerprint pattern, an eyeball pattern, a palm veins pattern, a palm print pattern, facial characteristic, hand geometry, etc. The supplementary parameters comprise, for example, a geographical location, room temperature, external environmental temperature, etc. The cloud security system uses hardware components and software components for detection and differentiation of the user's fingerprint pattern, the eyeball pattern, the palm veins pattern, etc., for biometric data recognition and identification of a user, and for encryption and decryption of the stored data to reduce hacking of the stored data. The cloud security system precludes hackers from visiting and manipulating personal data in each cloud computing system, for example, a mobile cloud system, a virtualization cloud system, a mobile virtualization cloud system, etc. The cloud security system performs network control access that detects intrusions and prevents a virus from infecting files or hosts in the cloud storage environment.

Detection of biometric data, for example, the fingerprint pattern, the palm veins pattern, and the eyeball pattern facilitates protection of the stored data from threats in a network and secures the stored data. The cloud security system further monitors data access in real time to secure mobile and internet applications. In an example, the cloud security system encodes the resultant data obtained from the application of the security algorithms to the stored data with a global identifier (ID), in combination with a user's fingerprint pattern and/or palm veins pattern and supplementary parameters such as room temperature and environmental temperature for facilitating secure access to the resultant data. The cloud security system can detect a fake fingerprint pattern and/or a fake palm veins pattern based on the room temperature and the environmental temperature. The cloud security system uses the security identifier in combination with the user's fingerprint pattern and/or the user's palm veins pattern to prevent multiple unauthorized copies of the user's fingerprint pattern and/or the user's palm veins pattern from being used in different locations to access the data. For example, in situations where adhesive tapes are used to obtain an imprint of a fingerprint pattern or a palm veins pattern, a fingerprint pattern of a particular user may be found in two different geographical locations, for example, London and Australia, whereas the user's palm veins pattern may be found in London and another geographical location such as Paris. By using a combination of the security identifier, the fingerprint pattern, the palm veins pattern, and the environmental temperature, the cloud security system can detect a fake fingerprint pattern and/or a fake palm veins pattern found in different locations. Similarly, the cloud security system uses the security identifier in combination with the user's eyeball pattern to prevent multiple unauthorized copies of the user's eyeball pattern from being used in different locations. The cloud security system can detect a fake eyeball pattern based on the room temperature and the environmental temperature.

The cloud security system monitors access to the stored data in real time and protects the stored data with redaction, masking, encryption and decryption features. The cloud security system further classifies and scales critical data to provide enhanced protection, for example, to physical, virtual, cloud and other big data systems. The cloud security system further identifies a source of malware in a network, for example, using the security identifier, storage device information, user information, etc. Based on the security identifier, for example, the global identifier (ID), the cloud security system determines, for example, a server name, a street name, a machine name, and an owner name associated with a malware infected machine and removes the malware infected machine from the network or transmits a notification to inform authorized personnel to determine and implement a course of action. The cloud security system further transmits the encoded resultant data to a predetermined location specified in the header assigned by the cloud security system prior to application of the security algorithms on the stored data.

In an embodiment, the cloud security system automatically removes electronic mail messages and files after a predetermined time interval of application of the security algorithms on the stored data. The predetermined time interval is, for example, 1 hour. The cloud security system automatically removes files comprising, for example, temporary internet files, cookie information, history information, messages, project designs, etc., on completion of execution of specific tasks or processes. Furthermore, the cloud security system identifies a network leakage in the cloud storage environment. In an embodiment, the cloud security system creates a network leakage checkpoint in the cloud storage environment. In an embodiment, the cloud security system provides a checkpoint of watermark of a network, device, and networking. In another embodiment, the cloud security system connects to a security barcode with a checkpoint mark and security features.

In an embodiment, the cloud security system is further configured to connect to and communicate with one or more of multiple external security systems comprising, for example, a firewall security system, a software security system, etc. The cloud security system implements multiple different layers of security using multiple security algorithms as exemplarily illustrated in FIG. 3. The cloud security system performs different functions on the stored data and stores the resultant data in predetermined locations. The first layer utilizes hardware and software components to perform biometric data recognition, for example, fingerprint pattern and eyeball pattern recognition in combination with a user's authentication information such as a user's password. The cloud security system implements the first layer to determine and verify the biometric data, for example, the fingerprint pattern and the eyeball pattern of the user who wants to access the resultant data. The second layer incorporates software security in a firewall security system of an entity, for example, a company or a firm. The cloud security system implements the second layer by connecting to the firewall security system and software security systems. The third layer performs malware software elimination security. The cloud security system implements one or more of the security algorithms disclosed above to facilitate elimination of files infected with malware software. The fourth layer performs cookie and history information elimination. The cloud security system implements the fourth layer to eliminate cookies and history data from the stored data. The fifth layer performs Trojan horse virus removal. The cloud security system implements the fifth layer to eliminate files infected with the Trojan horse virus. The cloud security system implements the fifth layer on output data, that is, the resultant data obtained after application of the security algorithms on the stored data to remove the Trojan horse virus and other malware. The sixth layer performs piggyback ride virus removal on typical file systems and operating systems. The cloud security system implements the sixth layer to eliminate viruses that piggyback on files in the stored data received, for example, from file systems and operating systems.

For purposes of illustration, the detailed description refers to six layers of security implemented by the cloud security system; however the scope of the computer implemented method and the system disclosed herein is not limited to the six layers of security but may be extended to include multiple other levels and layers of security. The cloud security system implements any combination of the layers of security simultaneously using different security algorithms.

During local networking and worldwide networking in the cloud storage environment, the cloud security system facilitates transfer of the encoded resultant data having a specific key, that is, the security identifier, the biometric data, for example, a fingerprint pattern, and the authentication information, for example, a password certificate to the locations of the sources from where the data is received. In an embodiment, when a hacker hacks a network, the cloud security system truncates the resultant data without a trace, thereby preventing the hacker from accessing the resultant data. In an embodiment, the cloud security system implemented with glue logic connects to a two dimensional element of a security system executed on top of a security chip. In another embodiment, the cloud security system connects to a three-dimensional (3D) direction of the security system executed on top of the security chip.

Figure 2:
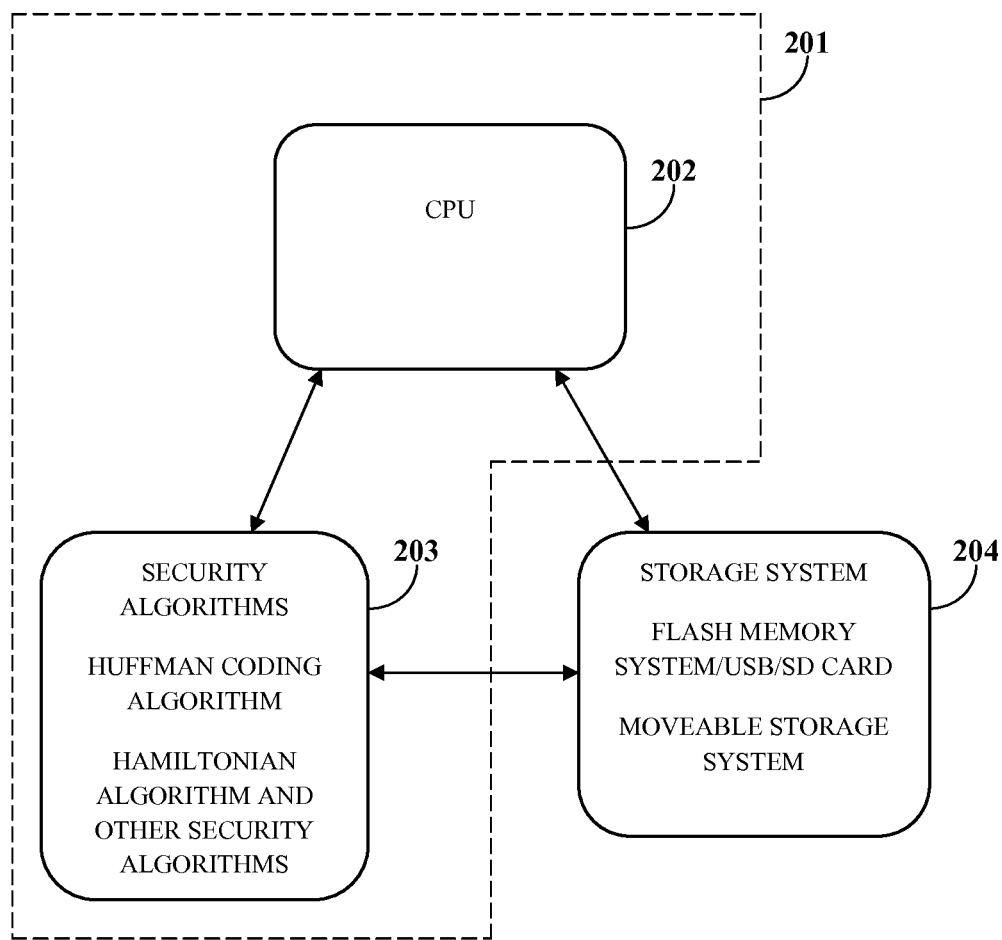
FIG. 2 exemplarily illustrates a block diagram showing interconnectivity and communication between a cloud security system and storage systems for securing data using multiple security algorithms.

FIG. 2 exemplarily illustrates a block diagram showing interconnectivity and communication between the cloud security system 201 and storage systems 204 for securing data using multiple security algorithms. The cloud security system 201 comprises a central processing unit (CPU) 202 configured on a computing device, for example, a personal computer, a server, etc., and an algorithm block 203. The CPU 202 of the cloud security system 201 receives data from different sources such as storage systems 204, for example, flash memory devices, universal serial bus (USB) devices, secure digital (SD) cards, moveable storage systems, etc., and applies the security algorithms on the received data. The CPU 202 provides paths for input data flow and output data flow in the cloud storage environment. The security algorithms applied by the cloud security system 201 are represented in the algorithm block 203 in FIG. 2. The CPU 202 executes the security algorithms, for example, the Huffman coding algorithm, the Hamiltonian algorithm, etc., to perform multiple security actions or functions on the received data as disclosed in the detailed description of FIG. 3.

Figure 3:
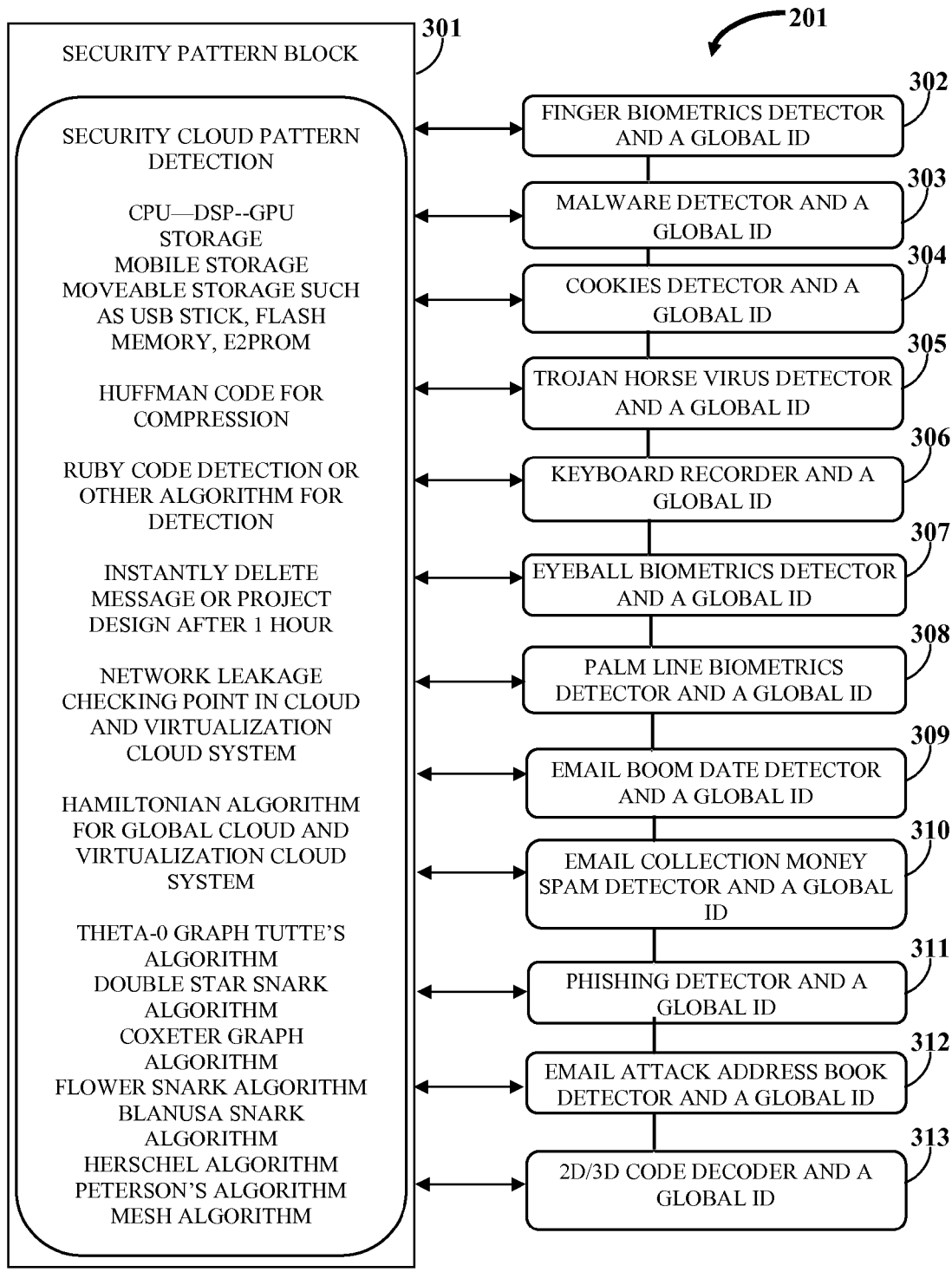
FIG. 3 exemplarily illustrates a block diagram showing hardware components and software components of the cloud security system.

FIG. 3 exemplarily illustrates a block diagram showing hardware components and software components of the cloud security system 201. In an embodiment, the cloud security system 201 is configured as a combination of a central processing unit (CPU) 202 exemplarily illustrated in FIG. 2, a digital signal processor, and a graphics processing unit (GPU). The cloud security system 201 receives data from multiple sources, for example, mobile storage devices, moveable storage devices such as universal serial bus (USB) sticks, flash memory devices, devices with an electrically erasable programmable read-only memory (E2PROM), etc., decodes the received data, and stores the decoded data in one or more storage locations. The software components of the cloud security system 201 and one or more security actions performed by the software components are exemplarily represented in a security pattern block 301 in FIG. 3. The cloud security system 201 connects to the security pattern block 301 and performs security cloud pattern detection as follows. The cloud security system 201 performs encryption and decryption with compression coding on the stored data using one or more of the security algorithms, for example, the Huffman coding algorithm, moving picture experts group 4 (MPEG4) coding, H266 coding, etc. The cloud security system 201 applies another one of the algorithms, for example, a Ruby code detection or another detection algorithm for detection.

In an embodiment, the cloud security system 201 deletes messages or a project design from the stored data after a predetermined time interval, for example, 1 hour of storing the data. Furthermore, the cloud security system 201 determines leakage of data in a network at a network leakage checkpoint in a cloud and virtualization cloud system. For global cloud and virtualization cloud systems, the cloud security system 201 applies the security algorithms, for example, the Hamiltonian algorithm, Theta-0 graph Tutte's algorithm, the double star snark algorithm, the Coxeter graph algorithm, the flower snark algorithm, the Blanusa snark algorithm, the Herschel algorithm, Peterson's algorithm, the mesh algorithm, or other algorithms exemplarily illustrated in the security pattern block 301, on the stored data to perform one or more security actions on the stored data.

The hardware components of the cloud security system 201 comprise, for example, a fingerprint biometrics detector 302, a malware detector 303, a cookies detector 304, a Trojan horse virus detector 305, a keyboard recorder 306, an eyeball biometrics detector 307, a palm line biometrics detector 308, an electronic mail (email) boom date detector 309, an email collection money spam detector 310, a phishing detector 311, an email attack address book detector 312, and a two-dimensional (2D) or three-dimensional (3D) code decoder 313 as exemplarily illustrated in FIG. 3. The hardware components perform their respective functions in association with a security identifier (ID) such as a global ID. The cloud security system 201 performs global ID detection, for example, based on a geographical location of a continent, country, city, county, village, and street; supplementary parameters such as room temperature, environmental temperature, etc.; and physical internet global IDs, address, and location of machines using internet protocols (IPs), for example, IPv6 and IPv4.

The fingerprint biometrics detector 302, the eyeball biometrics detector 307, and the palm line biometrics detector 308 are used for biometric identification purposes, for example, differentiating a user's fingerprint pattern, an eyeball pattern, and a palm veins pattern respectively. The fingerprint pattern, the eyeball pattern, and the palm veins pattern are different for each user. Further, the environmental temperature varies from location to location and can be used to identify a user from a different location. In an embodiment, the fingerprint biometrics detector 302, the eyeball biometrics detector 307, and the palm line biometrics detector 308 identify the user with a fake fingerprint pattern, and/or a fake eyeball pattern, and/or a fake palm veins pattern respectively, using the environmental temperature. The fingerprint biometrics detector 302 performs fingerprint recognition, for example, based on a geographical location, room temperature, environmental temperature, the global identifier (ID), address and location of machines using internet protocols such as IPv6 and IPv4, etc., for authenticating a user for security purposes. The eyeball biometrics detector 307 performs eyeball recognition, for example, based on a geographical location, room temperature, environmental temperature, the global ID, address and location of machines using internet protocols such as IPv6 and IPv4, etc., for authenticating a user for security purposes. The palm line biometrics detector 308 performs palm veins recognition, for example, based on a geographical location, room temperature, environmental temperature, the global ID, address and location of machines using internet protocols such as IPv6 and IPv4, etc., for authenticating a user for security purposes. The cloud security system 201 uses the global ID with the fingerprint biometrics detector 302, the eyeball biometrics detector 307, and the palm line biometrics detector 308 to detect and match the user's corresponding biometric data based on factors comprising, for example, the global location, the room temperature, and the environmental temperature.

The cloud security system 201 uses different levels of security, for example, for malware, viruses, cookies, advertisement links to target customers, Trojan horse detection, phishing, websites, etc., in real time. The malware detector 303 detects malware infected data and the corresponding malware infected machine, for example, using the global ID. The cookies detector 304 detects cookies in the stored data, for example, using the global ID. The Trojan horse virus detector 305 detects and eliminates files infected with the Trojan horse virus, for example, using the global ID. In an embodiment, the keyboard recorder 306 records and identifies authentic keystrokes, for example, using the global ID. The email boom date detector 309 and the email collection money spam detector 310 provide security related to emails, for example, using the global ID. The phishing detector 311 detects and removes phishing messages and emails from the stored data, for example, using the global ID. The email attack address book detector 312 detects and removes a compromised address book associated with compromised email addresses in the stored data, for example, using the global ID. The two-dimensional (2D) or three-dimensional (3D) code decoder 313 encodes and decodes the data received from the sources, for example, using the global ID.

Figure 4:
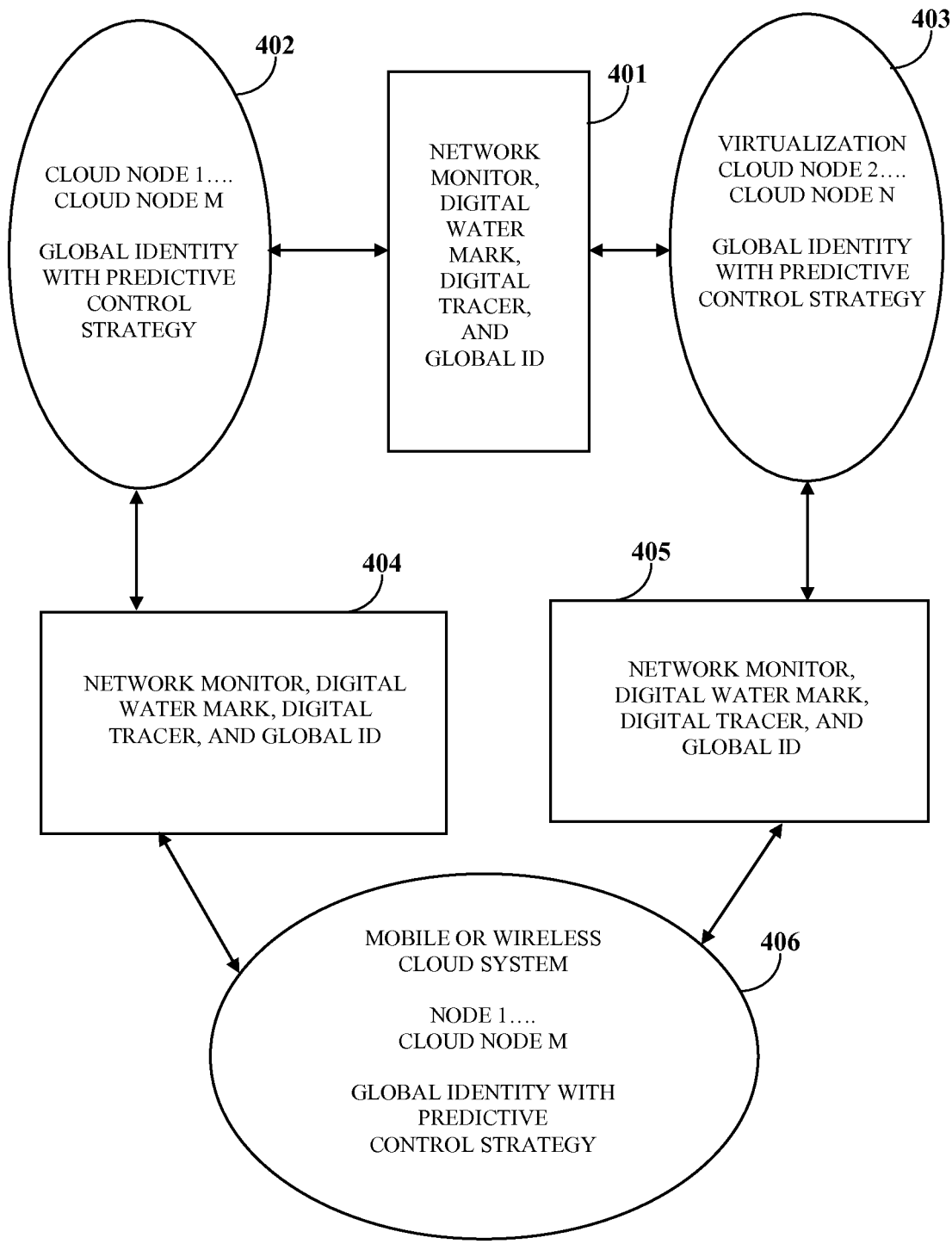
FIG. 4 exemplarily illustrates interconnectivity between nodes in a cloud storage environment.

FIG. 4 exemplarily illustrates interconnectivity between nodes in a cloud storage environment. Each cloud node contains the cloud security system 201 comprising the central processing unit (CPU) 202 and the algorithm block 203 exemplarily illustrated in FIG. 2. The cloud security system 201 applies the security algorithms from the algorithm block 203 on the stored data based on a location of each cloud node in a cloud system 402, a virtualization cloud system 403, and a mobile or wireless cloud system 406. The cloud security system 201 provides a global identity and implements a predictive control strategy to secure data in each of multiple cloud nodes of the cloud system 402, the virtualization cloud system 403, and the mobile or wireless cloud system 406. The cloud security system 201 monitors the network, validates watermarking of the network, the stored data, and the storage locations, and tracks the stored data using the global identifier (ID) across the cloud nodes of the cloud system 402, the virtualization cloud system 403, and the mobile or wireless cloud system 406 as shown in blocks 401, 404, and 405.

Figure 5:
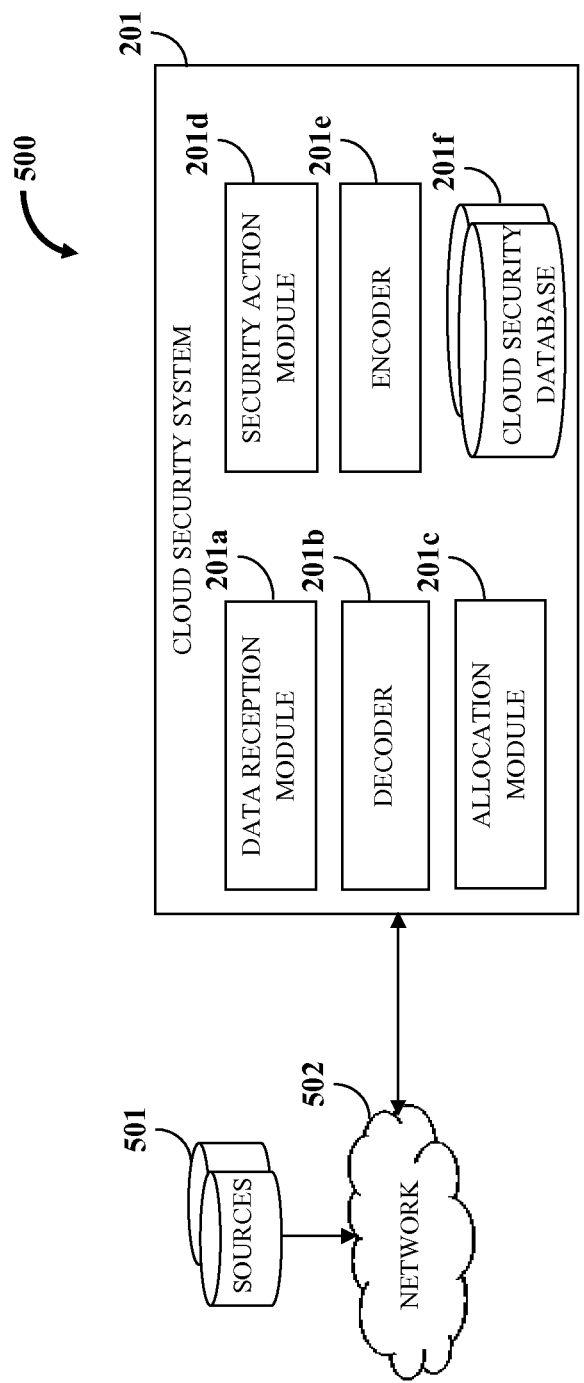
FIG. 5 exemplarily illustrates a computer implemented system for securing data in a cloud storage environment.

FIG. 5 exemplarily illustrates a computer implemented system 500 for securing data in a cloud storage environment. The computer implemented system 500 disclosed herein comprises the cloud security system 201 in communication with multiple sources 501 of data, for example, storage systems 204 exemplarily illustrated in FIG. 2, via a network 502. In an embodiment, the cloud security system 201 is implemented in a cloud computing environment. As used herein, "cloud computing environment" refers to a processing environment comprising configurable computing physical and logical resources, for example, networks, servers, storage, applications, services, etc., and data distributed over the network 502. The cloud computing environment provides on-demand network access to a shared pool of the configurable computing physical and logical resources. In an embodiment, the cloud security system 201 is a cloud computing based platform implemented as a service for securing data in the cloud storage environment. The cloud security system 201 is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc. In an embodiment, the cloud security system 201 further connects to and communicates with one or more of multiple external security systems, for example, a firewall security system, a software security system, etc.

The network 502 through which the cloud security system 201 accesses the sources 501 of data and external security systems is, for example, the internet, an intranet, a wireless network, a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a long-term evolution (LTE) mobile communication network, etc., a local area network, a wide area network, an internet connection network, an infrared communication network, etc., or a network formed from any combination of these networks.

The cloud security system 201 disclosed herein comprises a non-transitory computer readable storage medium and at least one processor, for example, a central processing unit (CPU) 202 exemplarily illustrated in FIG. 2, communicatively coupled to the non-transitory computer readable storage medium. As used herein, "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The non-transitory computer readable storage medium is configured to store computer program instructions defined by modules, for example, 201a, 201b, 201c, 201d, 201e, etc., of the cloud security system 201. The processor is configured to execute the defined computer program instructions.

The cloud security system 201 disclosed herein further comprises a data reception module 201a, a decoder 201b, an allocation module 201c, a security action module 201d, an encoder 201e, and a cloud security database 201f. The data reception module 201a receives data of multiple types from multiple sources 501. The decoder 201b decodes the received data and stores the decoded data in one or more of multiple storage locations within the cloud storage environment. The allocation module 201c allocates one or more of multiple security actions comprising, for example, elimination of malware from the stored data, elimination of cookie information and history information associated with the stored data, elimination of a Trojan horse malware program in the stored data, elimination of viruses that piggyback on the stored data, validating watermarking of a network and the storage locations, etc., to be performed on the stored data in each of the storage locations.

The security action module 201d applies multiple security algorithms configured to perform the allocated security actions on the stored data in each of the storage locations as disclosed in the detailed description of FIG. 3. In an embodiment, the security action module 201d identifies a source of malware in a network using the security identifier, storage device information, and user information. In another embodiment, the security action module 201d automatically removes electronic mail messages and files after a predetermined time interval. In another embodiment, the security action module 201d further identifies a network leakage. The encoder 201e encodes resultant data obtained from the application of the security algorithms to the stored data with a security identifier in combination with one or more of authentication information of a user, biometric data of the user, and supplementary parameters for facilitating secure access to the resultant data.

The cloud security database 201f is any storage area or medium that can be used for storing data and files. In an embodiment, the cloud security system 201 stores the received and decoded data, and the resultant data in the cloud security database 201f. The cloud security database 201f is, for example, a structured query language (SQL) data store or a not only SQL (NoSQL) data store such as the Microsoft® SQL Server®, the Oracle® servers, the MySQL® database of MySQL AB Company, the MongoDB® of MongoDB, Inc., the Neo4j graph database of Neo Technology Corporation, the Cassandra database of the Apache Software Foundation, the HBase™ database of the Apache Software Foundation, etc. In an embodiment, the cloud security database 201f can also be a location in a file system. In another embodiment, the cloud security database 201f can be remotely accessed by the cloud security system 201 via the network 502. In another embodiment, the cloud security database 201f is configured as a cloud based database implemented in a cloud computing environment, where computing resources are delivered as a service over the network 502.

Figure 6:
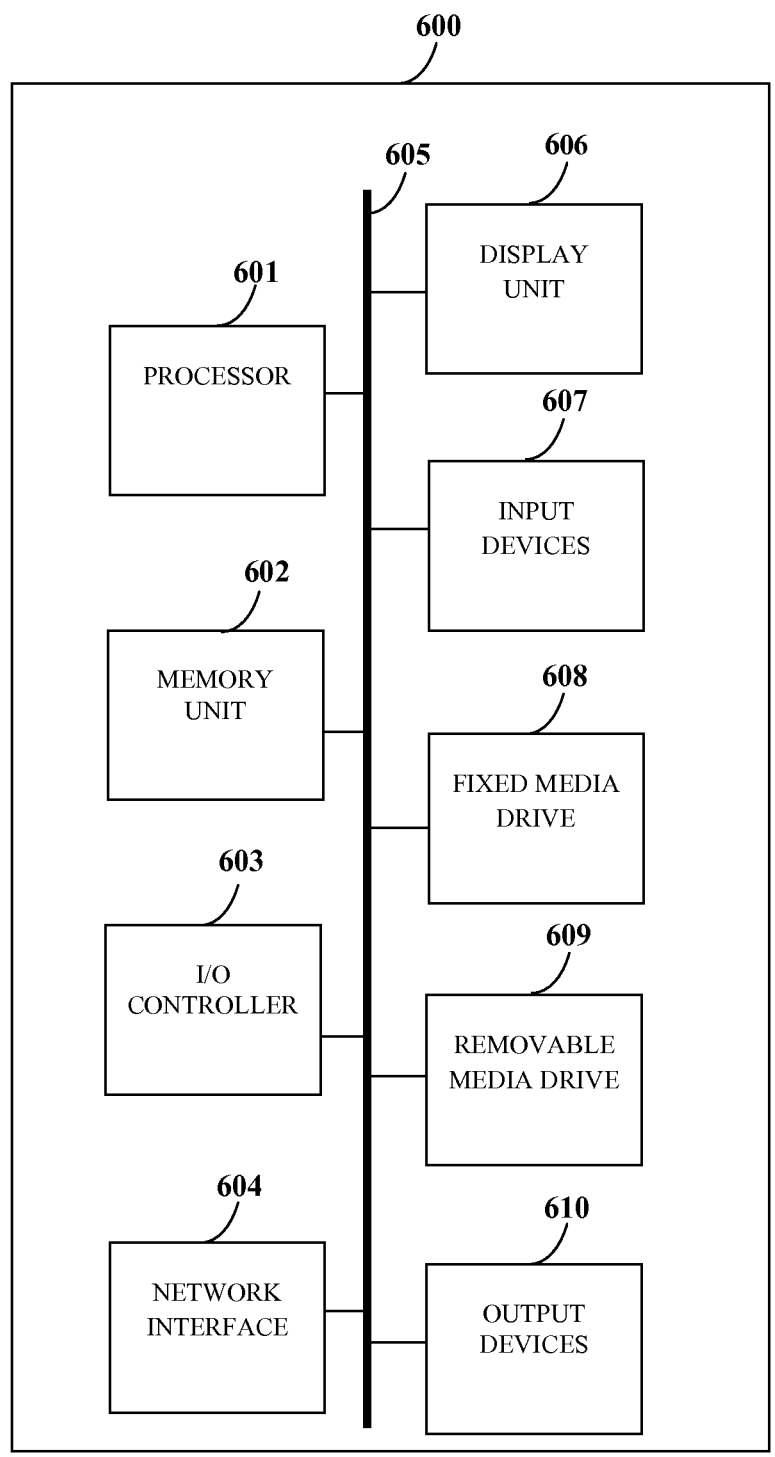
FIG. 6 exemplarily illustrates the hardware architecture of the cloud security system employed for securing data in a cloud storage environment.

FIG. 6 exemplarily illustrates the hardware architecture 600 of the cloud security system 201 exemplarily illustrated in FIGS. 2-3 and FIG. 5, employed for securing data in a cloud storage environment. The cloud security system 201 is a computer system that is programmable using a high level computer programming language. The cloud security system 201 may be implemented using programmed and purposeful hardware. The cloud security system 201 is accessible by users through multiple sources 501 via a network 502 exemplarily illustrated in FIG. 5, for example, a short range network or a long range network.

As exemplarily illustrated in FIG. 6, the hardware architecture 600 of the cloud security system 201 comprises a processor 601, a non-transitory computer readable storage medium such as a memory unit 602 for storing programs and data, an input/output (I/O) controller 603, a network interface 604, a data bus 605, a display unit 606, input devices 607, a fixed media drive 608 such as a hard drive, a removable media drive 609 for receiving removable media, output devices 610, etc. The processor 601 refers to any one or more microprocessors, central processing unit (CPU) devices such as the central processing unit (CPU) 202 exemplarily illustrated in FIG. 2, finite state machines, computers, microcontrollers, digital signal processors, logic, glue logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 601 may also be implemented as a processor set comprising, for example, a programmed microprocessor and a math or graphics co-processor. The processor 601 is selected, for example, from the Intel® processors such as the Itanium® microprocessor or the Pentium® processors, Advanced Micro Devices (AMD®) processors such as the Athlon® processor, UltraSPARC® processors, MicroSPARC® processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The cloud security system 201 disclosed herein is not limited to employing a processor 601. The cloud security system 201 may also employ a controller or a microcontroller. The processor 601 executes the modules, for example, 201a, 201b, 201c, 201d, 201e, etc., of the cloud security system 201.

The memory unit 602 is used for storing programs, applications, and data. For example, the data reception module 201a, the decoder 201b, the allocation module 201c, the security action module 201d, the encoder 201e, etc., are stored in the memory unit 602 of the cloud security system 201. The memory unit 602 is, for example, a random access memory (RAM) or another type of dynamic storage device that stores information and instructions for execution by the processor 601. The memory unit 602 also stores temporary variables and other intermediate information used during execution of the instructions by the processor 601. The cloud security system 201 further comprises a read only memory (ROM) or another type of static storage device that stores static information and instructions for the processor 601. The I/O controller 603 controls input actions and output actions performed by the cloud security system 201.

The network interface 604 enables connection of the cloud security system 201 to the network 502. In an embodiment, the network interface 604 is provided as an interface card also referred to as a line card. The network interface 604 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 605 permits communications between the modules, for example, 201a, 201b, 201c, 201d, 201e, 201f, etc., of the cloud security system 201.

The display unit 606 displays information, display interfaces, user interface elements such as text fields, checkboxes, text boxes, windows, etc., for allowing a user to enter authentication information comprising, for example, a username, a password, etc. The display unit 606 comprises, for example, a liquid crystal display, a plasma display, an organic light emitting diode (OLED) based display, etc. The input devices 607 are used for inputting data into the cloud security system 201. The input devices 607 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the cloud security system 201. The programs are loaded onto the fixed media drive 608 and into the memory unit 602 of the cloud security system 201 via the removable media drive 609. In an embodiment, the computer applications and programs may be loaded directly via the network 502. Computer applications and programs are executed by double clicking a related icon displayed on the display unit 606 using one of the input devices 607. The output devices 610 output the results of operations performed by the cloud security system 201. For example, the cloud security system 201 provides the resultant data to the users using the output devices 610.

The processor 601 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., Palm OS®, the Solaris operating system developed by Sun Microsystems, Inc. (Oracle acquired to be part of Oracle operating systems), the Android operating system, the Windows Phone® operating system of Microsoft Corporation, the BlackBerry® operating system of BlackBerry Limited, the iOS operating system of Apple Inc., the Symbian™ operating system of Symbian Foundation Limited, etc. The cloud security system 201 employs the operating system for performing multiple tasks. The operating system is responsible for management and coordination of activities and sharing of resources of the cloud security system 201. The operating system further manages security of the cloud security system 201, peripheral devices connected to the cloud security system 201, and network connections. The operating system employed on the cloud security system 201 recognizes, for example, inputs provided using one of the input devices 607, the output display, files, and directories stored locally on the fixed media drive 608. The operating system on the cloud security system 201 executes different programs using the processor 601. The processor 601 and the operating system together define a computer system for which application programs in high level programming languages are written.

The processor 601 of the cloud security system 201 retrieves instructions defined by the data reception module 201a, the decoder 201b, the allocation module 201c, the security action module 201d, the encoder 201e, etc., for performing respective functions disclosed in the detailed description of FIG. 5. The processor 601 retrieves instructions for executing the modules, for example, 201a, 201b, 201c, 201d, 201e, etc., of the cloud security system 201 from the memory unit 602. A program counter determines the locations of the instructions in the memory unit 602. The program counter stores a number that identifies the current position in the program of each of the modules, for example, 201a, 201b, 201c, 201d, 201e, etc., of the cloud security system 201. The instructions fetched by the processor 601 from the memory unit 602 after being processed are decoded. The instructions are stored in an instruction register in the processor 601. After processing and decoding, the processor 601 executes the instructions, thereby performing one or more processes defined by those instructions.

At the time of execution, the instructions stored in the instruction register are examined to determine the operations to be performed. The processor 601 then performs the specified operations. The operations comprise arithmetic operations and logic operations. The operating system performs multiple routines for performing a number of tasks required to assign the input devices 607, the output devices 610, and memory for execution of the modules, for example, 201a, 201b, 201c, 201d, 201e, etc., of the cloud security system 201. The tasks performed by the operating system comprise, for example, assigning memory to the modules, for example, 201a, 201b, 201c, 201d, 201e, etc., of the cloud security system 201, and to data used by the cloud security system 201, moving data between the memory unit 602 and disk units, and handling input/output operations. The operating system performs the tasks on request by the operations and after performing the tasks, the operating system transfers the execution control back to the processor 601. The processor 601 continues the execution to obtain one or more outputs. The outputs of the execution of the modules, for example, 201a, 201b, 201c, 201d, 201e, etc., of the cloud security system 201 are displayed on the display unit 606.

For purposes of illustration, the detailed description refers to the cloud security system 201 being run locally as a single computer system; however the scope of the computer implemented method and system 500 disclosed herein is not limited to the cloud security system 201 being run locally as a single computer system via the operating system and the processor 601, but may be extended to run remotely over the network 502 by employing a web browser and a remote server, a mobile phone, or other electronic devices. One or more portions of the cloud security system 201 may be distributed across one or more computer systems (not shown) coupled to the network 502.

Disclosed herein is also a computer program product comprising a non-transitory computer readable storage medium that stores computer program codes comprising instructions executable by at least one processor 601 for securing data in a cloud storage environment. The computer program product comprises a first computer program code for receiving data of multiple types from multiple sources 501 exemplarily illustrated in FIG. 5; a second computer program code for decoding the received data; a third computer program code for storing the decoded data in one or more of multiple storage locations within the cloud storage environment; a fourth computer program code for allocating one or more of multiple security actions to be performed on the stored data in each of the storage locations; a fifth computer program code for applying multiple security algorithms to perform the allocated security actions on the stored data in each of the storage locations; and a sixth computer program code for encoding resultant data obtained from the application of the security algorithms to the stored data with a security identifier in combination with one or more of authentication information of a user, biometric data of the user, and supplementary parameters for facilitating secure access to the resultant data.

The computer program product disclosed herein further comprises a seventh computer program code for identifying a source of malware in a network using the security identifier, storage device information, and user information. The computer program product disclosed herein further comprises an eighth computer program code for automatically removing electronic mail messages and files after a predetermined time interval. The computer program product disclosed herein further comprises a ninth computer program code for identifying a network leakage. The computer program product disclosed herein further comprises one or more additional computer program codes for performing additional steps that may be required and contemplated for securing data in a cloud storage environment. In an embodiment, a single piece of computer program code comprising computer executable instructions performs one or more steps of the computer implemented method disclosed herein for securing data in a cloud storage environment. The computer program codes comprising computer executable instructions are embodied on the non-transitory computer readable storage medium. The processor 601 of the cloud security system 201 retrieves these computer executable instructions and executes them. When the computer executable instructions are executed by the processor 601, the computer executable instructions cause the processor 601 to perform the steps of the computer implemented method for securing data in a cloud storage environment.

It will be readily apparent that the various methods, security algorithms, and computer programs disclosed herein may be implemented on computer readable media appropriately programmed for computing devices. As used herein, "computer readable media" refers to non-transitory computer readable media that participate in providing data, for example, instructions that may be read by a computer, a processor, or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and security algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft® .NET etc. Other object-oriented, functional, scripting, and/or logical programming languages may also be used. The computer program codes or software programs may be stored on or in one or more mediums as object code. Various aspects of the method and the cloud security system 201 disclosed herein may be implemented as programmed elements, or non-programmed elements, or any suitable combination thereof. The computer program product disclosed herein comprises one or more computer program codes for implementing the processes of various embodiments.

Where databases are described such as the cloud security database 201f, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the cloud security system 201, the databases may be integrated to communicate with each other for enabling simultaneous updates of data linked across the databases, when there are any updates to the data in one of the databases.

The method and the cloud security system 201 disclosed herein can be configured to work in a network environment comprising one or more computers that are in communication with one or more devices via a network 502 exemplarily illustrated in FIG. 5. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network 502. Each of the computers and the devices executes an operating system, examples of which are disclosed above. While the operating system may differ depending on the type of computer, the operating system provides the appropriate communications protocols to establish communication links with the network 502. Any number and type of machines may be in communication with the computers.

The method and the cloud security system 201 disclosed herein are not limited to a particular computer system platform, processor, operating system, or network. One or more aspects of the method and the cloud security system 201 disclosed herein may be distributed among one or more computer systems, for example, servers configured to provide one or more services to one or more client computers, or to perform a complete task in a distributed system. For example, one or more aspects of the method and the cloud security system 201 disclosed herein may be performed on a client-server system that comprises components distributed among one or more server systems that perform multiple functions according to various embodiments. These components comprise, for example, executable, intermediate, or interpreted code, which communicate over a network 502 using a communication protocol. The method and the cloud security system 201 disclosed herein are not limited to be executable on any particular system or group of systems, and is not limited to any particular distributed architecture, network, or communication protocol.

The foregoing examples have been provided merely for the purpose of explanation and are in no way to be construed as limiting of the method and the cloud security system 201 disclosed herein. While the method and the cloud security system 201 have been described with reference to various embodiments, it is understood that the words, which have been used herein, are words of description and illustration, rather than words of limitation. Further, although the method and the cloud security system 201 have been described herein with reference to particular means, materials, and embodiments, the method and the cloud security system 201 are not intended to be limited to the particulars disclosed herein; rather, the method and the cloud security system 201 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the cloud security system 201 disclosed herein in their aspects.

We claim:

1. A computer implemented method for securing data in a cloud storage environment, said method employing a cloud security system comprising at least one processor configured to execute computer program instructions for performing said method, said method comprising:
   receiving data of a plurality of types from a plurality of sources by said cloud security system;
   decoding said received data and storing said decoded data in one or more of a plurality of storage locations within said cloud storage environment by said cloud security system;
   allocating one or more of a plurality of security actions to be performed on said stored data in each of said one or more of said storage locations by said cloud security system;
   applying a plurality of security algorithms configured to perform said allocated one or more of said security actions on said stored data in said each of said one or more of said storage locations by said cloud security system, wherein said security algorithms comprise the Huffman coding algorithm, the Ruby code detection algorithm, the Theta-0 graph Tutte's algorithm, the double star snark algorithm, the Coxeter graph algorithm, the flower snark algorithm, the Blanusa snark algorithm, Peterson's algorithm, the Herschel algorithm, the Hamiltonian algorithm, and a mesh algorithm; and encoding resultant data obtained from said application of said security algorithms to said stored data with a security identifier in combination with one or more of authentication information of a user, biometric data of said user, and supplementary parameters by said cloud security system for facilitating secure access to said resultant data.

2. The computer implemented method of claim 1, wherein said security actions comprise elimination of malware from said stored data, elimination of cookie information and history information associated with said stored data, elimination of a Trojan horse malware program in said stored data, elimination of viruses that piggyback on said stored data, and validating watermarking of a network and said storage locations.

3. The computer implemented method of claim 1, further comprising identifying a source of malware in a network by said cloud security system using said security identifier, storage device information, and user information.

4. The computer implemented method of claim 1, further comprising automatically removing electronic mail messages and files after a predetermined time interval by said cloud security system.

5. The computer implemented method of claim 1, further comprising identifying a network leakage by said cloud security system.

6. The computer implemented method of claim 1, wherein said supplementary parameters comprise a geographical location, room temperature, and external environmental temperature.

7. The computer implemented method of claim 1, wherein said biometric data comprises a fingerprint pattern, an eyeball pattern, a palm veins pattern, a palm print, facial characteristics, and hand geometry.

8. The computer implemented method of claim 1, further comprising connecting to and communicating with one or more of a plurality of external security systems by said cloud security system, wherein said external security systems comprise a firewall security system and a software security system.

9. A cloud security system for securing data in a cloud storage environment, said cloud security system comprising:
   a hardware processor executes the instruction to implement the modules;
   a non-transitory computer readable storage medium configured to store computer program instructions defined by modules of said cloud security system;
   at least one processor communicatively coupled to said non-transitory computer readable storage medium, said at least one processor configured to execute said defined computer program instructions for implementing said modules of said cloud security system; and
   said modules of said cloud security system comprising:
   a data reception module configured to receive data of a plurality of types from a plurality of sources;
   a decoder configured to decode said received data and store said decoded data in one or more of a plurality of storage locations within said cloud storage environment;
   an allocation module configured to allocate one or more of a plurality of security actions to be performed on said stored data in each of said one or more of said storage locations;
   a security action module configured to apply a plurality of security algorithms configured to perform said allocated one or more of said security actions on said stored data in said each of said one or more of said storage locations, wherein said security algorithms comprise the Huffman coding algorithm, the Ruby code detection algorithm, the Theta-0 graph Tutte's algorithm, the double star snark algorithm, the Coxeter graph algorithm, the flower snark algorithm, the Blanusa snark algorithm, Peterson's algorithm, the Herschel algorithm, the Hamiltonian algorithm, and a mesh algorithm; and
   an encoder configured to encode resultant data obtained from said application of said security algorithms to said stored data with a security identifier in combination with one or more of authentication information of a user, biometric data of said user, and supplementary parameters for facilitating secure access to said resultant data.

10. The cloud security system of claim 9, wherein said security actions comprise elimination of malware from said stored data, elimination of cookie information and history information associated with said stored data, elimination of a Trojan horse malware program in said stored data, elimination of viruses that piggyback on said stored data, and validating watermarking of a network and said storage locations.

11. The cloud security system of claim 9, wherein said security action module is further configured to identify a source of malware in a network using said security identifier, storage device information, and user information.

12. The cloud security system of claim 9, wherein said security action module is further configured to automatically remove electronic mail messages and files after a predetermined time interval.

13. The cloud security system of claim 9, wherein said security action module is further configured to identify a network leakage.

14. The cloud security system of claim 9, wherein said supplementary parameters comprise a geographical location, room temperature, and external environmental temperature.

15. The cloud security system of claim 9, wherein said biometric data comprises fingerprint pattern, an eyeball pattern, a palm veins pattern, a palm print, facial characteristics, and hand geometry.

16. The cloud security system of claim 9 configured to connect to and communicate with one or more of a plurality of external security systems, wherein said external security systems comprise a firewall security system and a software security system.

17. A computer program product comprising a non-transitory computer readable storage medium, said non-transitory computer readable storage medium storing computer program codes that comprise instructions executable by at least one processor, said computer program codes comprising:
   a first computer program code for receiving data of a plurality of types from a plurality of sources;
   a second computer program code for decoding said received data;
   a third computer program code for storing said decoded data in one or more of a plurality of storage locations within said cloud storage environment;

a fourth computer program code for allocating one or more of a plurality of security actions to be performed on said stored data in each of said one or more of said storage locations;

a fifth computer program code for applying a plurality of security algorithms to perform said allocated one or more of said security actions on said stored data in said each of said one or more of said storage locations, wherein said security algorithms comprise the Huffman coding algorithm, the Ruby code detection algorithm, the Theta-0 graph Tutte's algorithm, the double star snark algorithm, the Coxeter graph algorithm, the flower snark algorithm, the Blanusa snark algorithm, Peterson's algorithm, the Herschel algorithm, the Hamiltonian algorithm, and a mesh algorithm, and wherein said security actions comprise elimination of malware from said stored data, elimination of cookie information and history information associated with said stored data, elimination of a Trojan horse malware program in said stored data, elimination of viruses that piggyback on said stored data, and validating watermarking of a network and said storage locations; and a sixth computer program code for encoding resultant data obtained from said application of said security algorithms to said stored data with a security identifier in combination with one or more of authentication information of a user, biometric data of said user, and supplementary parameters for facilitating secure access to said resultant data.

18. The computer program product of claim 17, further comprising:

a seventh computer program code for identifying a source of malware in a network using said security identifier, storage device information, and user information;

an eighth computer program code for automatically removing electronic mail messages and files after a predetermined time interval; and a ninth computer program code for identifying a network leakage.

* * * * *